United States Patent
Tian et al.

(10) Patent No.: US 11,075,668 B2
(45) Date of Patent: Jul. 27, 2021

(54) METHODS AND COMPUTING DEVICE FOR BIT LEVEL SIGNAL PROCESSING

(71) Applicant: ZTE Corporation, Guangdong (CN)

(72) Inventors: Li Tian, Guangdong (CN); Zhifeng Yuan, Guangdong (CN); Ziyang Li, Guangdong (CN); Yuzhou Hu, Guangdong (CN); Jianqiang Dai, Guangdong (CN); Chen Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/168,615

(22) Filed: Feb. 5, 2021

(65) Prior Publication Data

US 2021/0194533 A1      Jun. 24, 2021

Related U.S. Application Data

(63) Continuation of application No. PCT/JP2018/099176, filed on Aug. 7, 2018.

(51) Int. Cl.
*H04B 1/69* (2011.01)
*H04L 1/00* (2006.01)
*H04J 13/16* (2011.01)

(52) U.S. Cl.
CPC .............. *H04B 1/69* (2013.01); *H04J 13/16* (2013.01); *H04L 1/0071* (2013.01)

(58) Field of Classification Search
CPC ........... H04B 1/69; H04J 13/16; H04L 1/0071
See application file for complete search history.

(56) References Cited

U.S. PATENT DOCUMENTS

| | | | |
|---|---|---|---|
| 6,912,241 B2* | 6/2005 | Giannakis | H04B 1/7097 375/141 |
| 7,349,460 B2* | 3/2008 | Choi | H04L 1/0003 370/320 |
| 7,352,796 B1* | 4/2008 | von der Embse | H04J 13/0048 375/146 |
| 7,483,933 B2* | 1/2009 | Wang | G06F 17/15 708/422 |
| 10,887,139 B2* | 1/2021 | Bayesteh | H04J 13/0003 |
| 2002/0044612 A1* | 4/2002 | Sipola | H03M 13/2789 375/295 |

(Continued)

FOREIGN PATENT DOCUMENTS

WO        2018100428 A1      6/2018

OTHER PUBLICATIONS

International Search Report and Written Opinion in International Application No. PCT/CN2018/099176, dated Apr. 28, 2019, 7 pages.

*Primary Examiner* — Freshteh N Aghdam
(74) *Attorney, Agent, or Firm* — Perkins Coie LLP

(57) ABSTRACT

According to various implementations, a device, such as a wireless communication device, carries out the following actions: for each element of a spreading sequence to be applied, determining, based on the element, whether to carry out randomization on a coded data stream, in which each element of the spreading sequence belongs to the set {1, −1, j, −j}; for each element of the spreading sequence for which randomization is determined to be applied, applying, based on the value of the element, one or more randomization techniques to the coded data stream; modulating the coded data stream; and transmitting the modulated data stream.

18 Claims, 5 Drawing Sheets

(56) References Cited

U.S. PATENT DOCUMENTS

| | | | |
|---|---|---|---|
| 2005/0141410 A1* | 6/2005 | Zhang | H04L 27/2614 370/206 |
| 2006/0039343 A1* | 2/2006 | Anderson | H04J 13/16 370/342 |
| 2008/0159537 A1* | 7/2008 | Khan | H04L 25/03866 380/268 |
| 2017/0359140 A1* | 12/2017 | Yuan | H04J 13/10 |
| 2018/0034501 A1* | 2/2018 | Li | H04B 1/7103 |
| 2019/0312694 A1* | 10/2019 | Jia | H04L 27/3488 |

* cited by examiner

METHODS AND COMPUTING DEVICE FOR BIT LEVEL SIGNAL PROCESSING

CROSS-REFERENCE TO RELATED APPLICATIONS

This application is a continuation of International Patent Application No. PCT/CN2018/099176, filed on Aug. 7, 2018, the contents of which are incorporated herein by reference in its entirety.

TECHNICAL FIELD

The present disclosure is related generally to wireless networks and, more particularly, to methods and a computing device for bit level signal processing.

BACKGROUND

Symbol-level spreading has been widely used in code division multiple access systems, where long spreading sequences are applied to randomize the inter-user and inter-cell interferences. Uplink signals from different users are spread using user-specific scrambling codes and superimposed with each other in shared physical (time/frequency) resources. Though multiple user interference is introduced by non-orthogonal transmission, the quality of service can be guaranteed if the spreading factor is large. However, large spreading factors lead to low data rates, which is not suitable for modern wideband service.

Spreading based non-orthogonal multiple access (NOMA) schemes have been proposed for newer wireless networks, in which the goal is to multiplex larger numbers of users and to achieve higher sum spectral efficiency than orthogonal resource based transmission. Spreading based schemes normally operate at symbol level, where the low inter-user interference is achieved by using low cross-correlation sequences such as WBE sequences, or by using low density spreading codes such as sparse codes. MMSE-SIC receivers can be used to achieve good interference rejection among multiple users at the symbol-level from joint code and spatial domains. However, wireless networks do not currently support symbol-level spreading for uplink data transmission.

DRAWINGS

While the appended claims set forth the features of the present techniques with particularity, these techniques, together with their objects and advantages, may be best understood from the following detailed description taken in conjunction with the accompanying drawings of which:

DESCRIPTION

According to various embodiments, a device, such as a wireless communication device, carries out the following actions: for each element of a spreading sequence to be applied, determining, based on the element, whether to carry out randomization on a coded data stream, wherein each element of the spreading sequence belongs to the set $\{1, -1, j, -j\}$; for each element of the spreading sequence for which randomization is determined to be applied, applying, based on the value of the element, one or more randomization techniques to the coded data stream; modulating the coded data stream; and transmitting the modulated data stream.

In an embodiment, for each element of the spreading sequence for which randomization is determined to be applied, the device carries out bit-level repetition on the coded data stream.

According to an embodiment, applying one or more randomization techniques to the coded data stream involves applying a scrambling technique to the coded data stream.

In an embodiment, applying one or more randomization techniques to the coded data stream involves applying an interleaving technique and applying a scrambling technique to the coded data stream.

According to an embodiment, applying an interleaving technique involves interleaving real and imaginary bits of the code data stream.

In an embodiment, applying a scrambling technique involves scrambling a 1 on a sign bit of a real bit of the code data stream.

According to an embodiment, applying a scrambling technique involves scrambling a 1 on a sign bit of an imaginary bit of the code data stream.

In an embodiment, applying a scrambling technique involves scrambling a 0 on a sign bit of a real bit of the code data stream.

According to an embodiment, applying a scrambling technique involves scrambling a 0 on a sign bit of an imaginary bit of the code data stream.

In an embodiment, the device also applies a spreading sequence to the modulated data stream.

According to an embodiment, modulating the coded data stream involves applying device-specific modulation to the coded data stream.

In an embodiment, the device also carries out bit-to-symbol mapping on the coded data stream.

Figure 1:
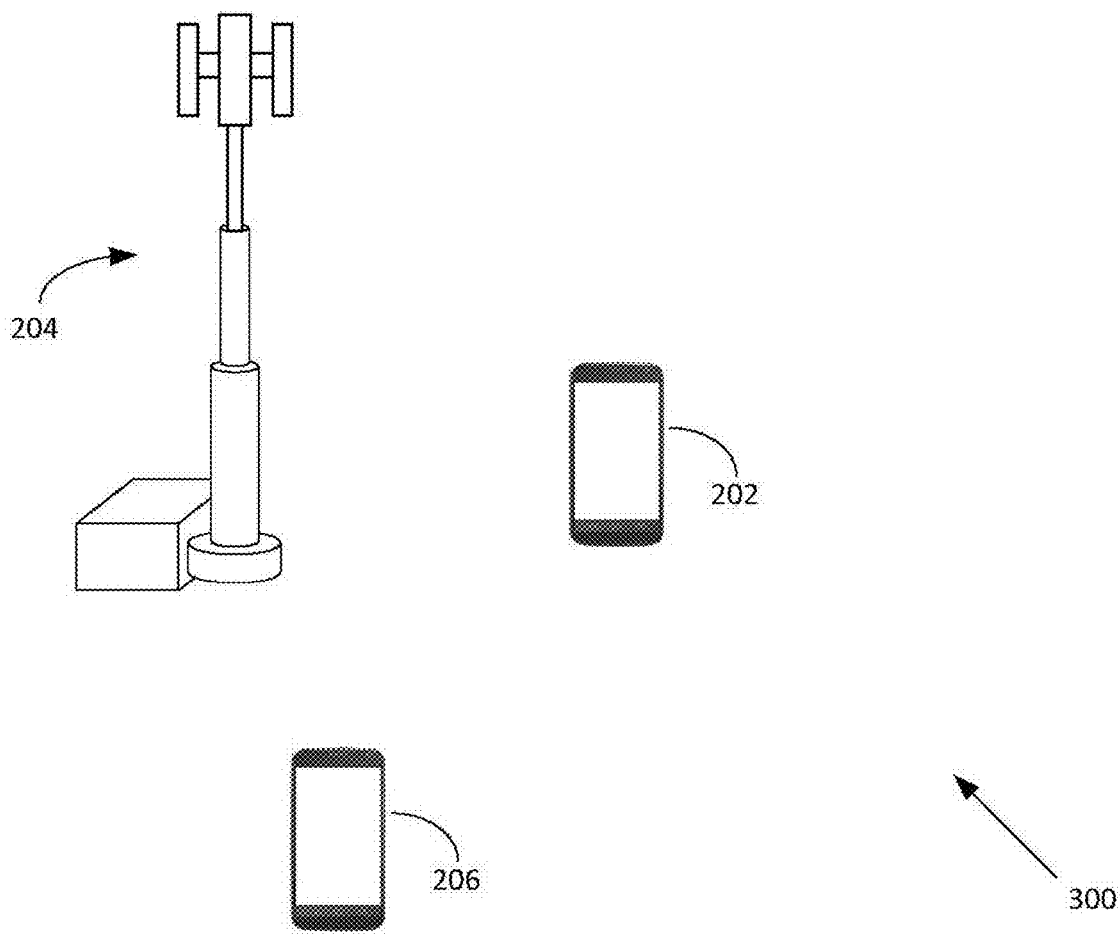
FIG. 1 is a diagram of a communication network in which various embodiments may be implemented.

Prior to further description of the various embodiments, an example of a communication system in which the various techniques described herein may be practiced will now be described with reference to FIG. 1, which depicts a multi-user wireless communication system 100. The communication system 100 includes several wireless communication devices. The communication devices depicted are a first wireless communication device 102 (depicted as a user equipment ("UE")), a network node 104 (depicted as a base station), and a second wireless communication device 106 (depicted as a UE). It is to be understood that there may be many other communication devices and that the ones represented in FIG. 1 are meant only for the sake of example. In an embodiment, the wireless communication system 100 has many other components that are not depicted in FIG. 1, including other network nodes, other UEs, wireless infrastructure, wired infrastructure, and other devices commonly found in wireless networks. Possible implementations of the wireless communication devices include any device capable of wireless communication, such as a smartphone, tablet, laptop computer, and non-traditional devices (e.g., household appliances or other parts of the "Internet of Things"). When operating as part of a wireless communication system, a wireless communication device may be referred to as a "wireless network node." A wireless communication device communicates primarily by transmitting and receiving wireless signals.

Figure 2:
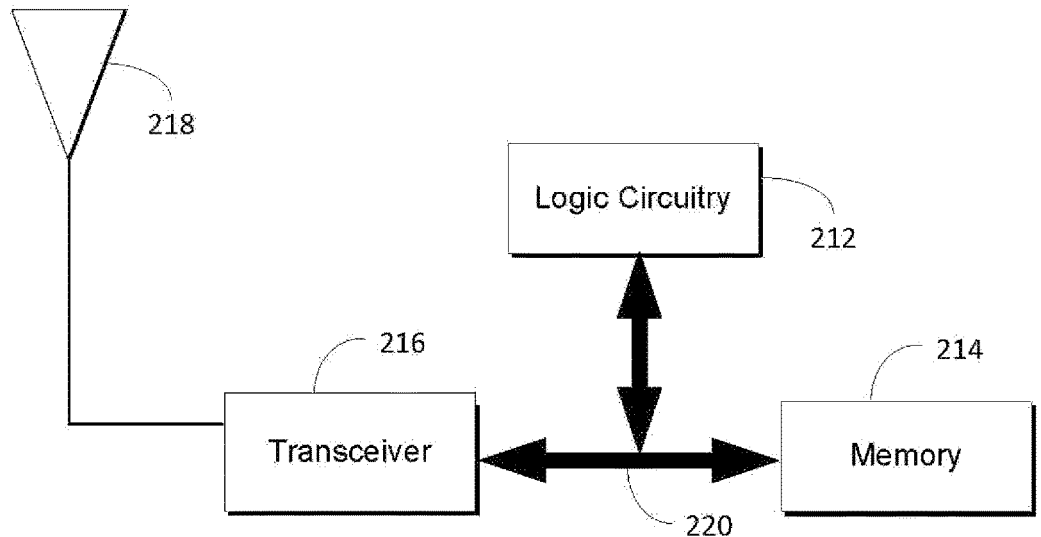
FIG. 2 is a diagram of a hardware architecture used by the various components of FIG. 1, according to an embodiment.

FIG. 2 illustrates a basic hardware architecture implemented by each of the wireless communication devices of FIG. 1, according to an embodiment. The elements of FIG. 2 may have other components as well. The hardware architecture depicted in FIG. 2 includes logic circuitry 212, memory 214, transceiver 216, and one or more antennas represented by antenna 218 (including transmit antennas and/or receive antennas). The memory 214 may be or include a buffer that, for example, holds incoming transmissions until the logic circuitry is able to process the transmission. Each of these elements is communicatively linked to one another via one or more data pathways 220. Examples of data pathways include wires, conductive pathways on a microchip, and wireless connections.

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a device carrying out an action, it is to be understood that this can also mean that logic circuitry integrated with the device is, in fact, carrying out the action.

Figure 3:
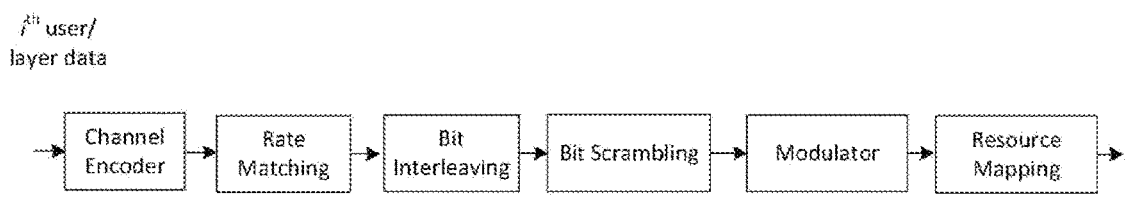
FIG. 3 is a block diagram showing transmitter-side processing for NOMA.
Figure 4:
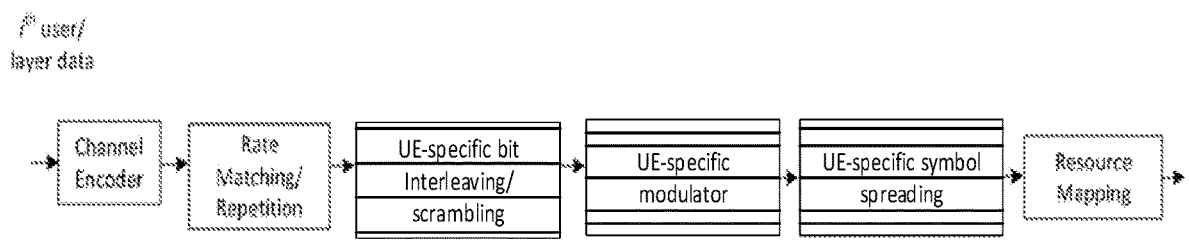
FIG. 4 is a block diagram showing transmitter-side processing for NOMA in which UE-specific processing is employed.

FIG. 3 depicts a general structure of transmitter side processing for current wireless systems. Many of the NOMA schemes described herein may involve channel coding with UE-specific bit-level interleaver/scrambling, UE-specific modulation or UE-specific symbol-level spreading (e.g., the three shaded blocks).

Adding NOMA schemes based on bit-level processing may have less impact on currently-used systems because the interleaving and scrambling processing is already being implemented in the transmitter of such systems. According to some implementations, the interleaving pattern for a NOMA system is UE-specific. Furthermore, the design of interleaving patterns or scrambling sequences are constructed so as to minimize the inter-user interferences.

Symbol-level spreading based NOMA schemes may not need to change the bit-level processing blocks from currently implemented designs. In addition, UE-specific spreading sequences are mainly used for UE differentiation and interference reduction. The de-spreading and channel equalization (with consideration of multi-user interferences) can be achieved simultaneously through the MMSE equalization from joint code and spatial domains. A single-user decoder can be assumed for bit-level processing at the receiver side. Therefore, no fundamental change is needed on the receiver side for symbol-level spreading based schemes.

For the symbol level spreading based NOMA schemes, the cross-correlation property of the spreading sequences between different UEs affects the overall system performance. For example, one possible design target for spreading sequences is to meet the Welch-bound equality (WBE) criteria for the cross-correlation among sequences, and to minimize the mean squared error (MSE) per user under the assumption of equal SNR distribution among NOMA users. The cross-correlation is related to the spreading length and the size of sequence pool, e.g., the longer the spreading length, the smaller the overall cross-correlation can be achieved, and if a larger sequence pool is desired to accommodate more UEs at a given spreading factor, higher cross-correlation will occur.

As previously discussed, for the newer systems where the spectral efficiency per UE is usually not very low, the spreading length should not be very long. Given the short spreading length, complex-valued sequences can provide larger sequence pool size compared with pseudo-noise (PN) sequences. For example, the length-L sequence with each of the element picked from $\{-1, 1, -j, j\}$ has $4^L$ different sequences, while PN sequences (element picked from $\{-1, 1\}$) has only $2^L$ different sequences.

Before continuing with the description, some of the terms used herein will now be clarified.

The term "randomization" as used herein refers to randomization of a series of bits (e.g., bits of a data stream). Examples of randomization include applying an interleaver, carrying out scrambling, and a combination of applying an interleaver and carrying out scrambling.

An example of "scrambling" as used herein is as follows: A communication device: 1) Generates a scrambling code whose length is equal to the length of the bits or symbols to be scrambled. 2) The input sequences are masked by the scrambling code.

An example of "bit-level repetition" as used herein is as follows: A communication device: 1) Generates a repeated sequence of 1s. 2) Multiplies an input sequence by an element of the repeated sequence. For example, a communication device generates a repeated sequence of [c1, c1, c1, c1, c2, c2, c2, c2, c3, c3, c3, c3] (assuming an original length-3 sequence and repetition factor of 4) Then, given an input sequence of [c1, c2, c3]T, the communication device multiplies [c1, c2, c3]T by [1, 1, 1, 1] and obtains [c1, c1, c1, c1; c2, c2, c2, c2; c3, c3, c3, c3]. The device then performs a parallel to serial transformation on this 3×4 matrix to obtain the 1×12 vector [c1, c2, c3, c1, c2, c3, c1, c2, c3, c1, c2, c3].

Described below are various techniques for achieving the equivalent results of complex-valued symbol-level spreading by using bit-level processing, according to various embodiments.

Figure 5A:
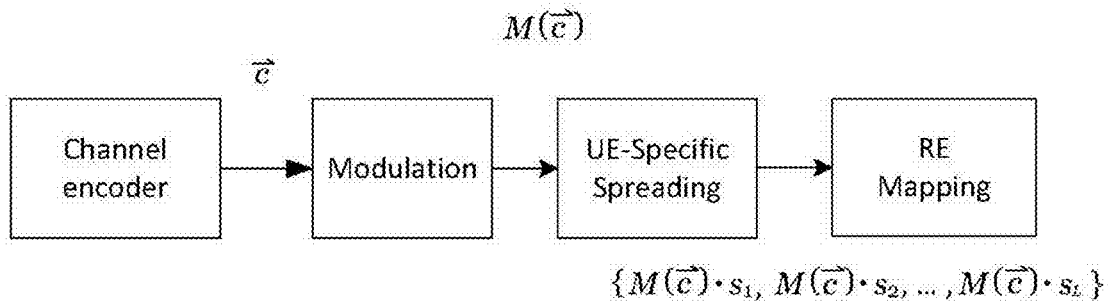
FIG. 5A is an example of symbol-level spreading
Figure 5B:
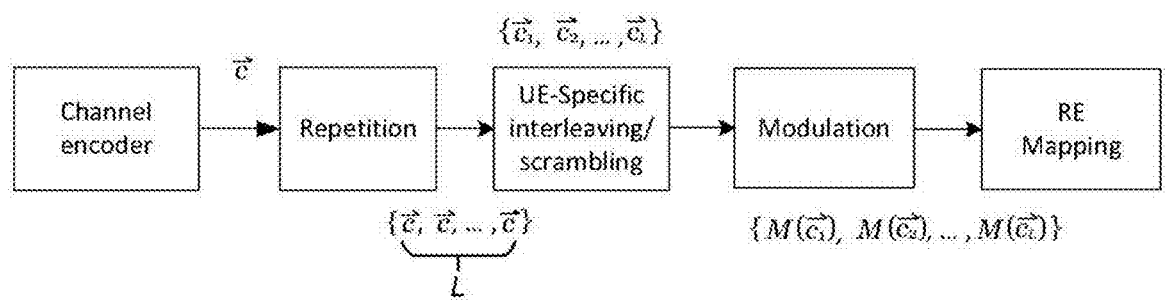
FIG. 5B is an implementation of spreading by bit-level processing, according to an embodiment.
Figure 5C:
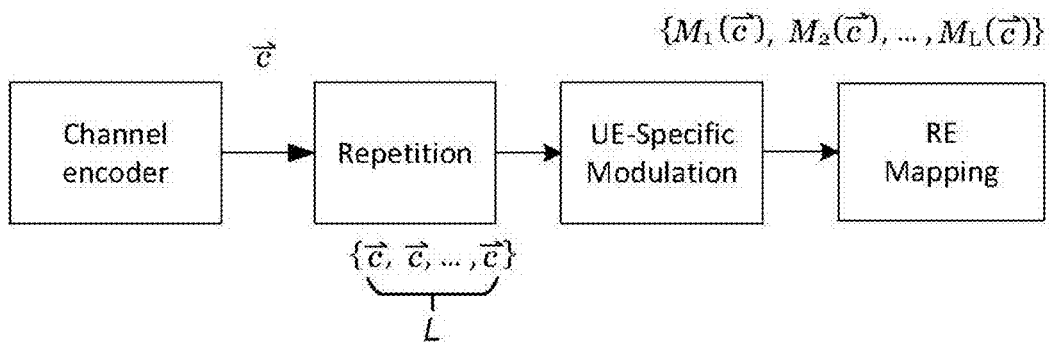
FIG. 5C is an implementation of spreading by UE-specific modulation, according to an embodiment.

FIG. 5A, FIG. 5B, and FIG. 5C illustrate different ways to realize signal processing with the effect of symbol-level spreading.

FIG. 5A illustrates the typical signal processing for symbol-level spreading. The coded binary bits $\vec{c}$ are mapped to symbol $M(\vec{c})$ through the modulator, e.g. QPSK, M-QAM. Then the modulated symbol is spread with the length-L spreading sequence $\{s_1, s_2, \ldots, s_L\}$ before mapping to the resource elements.

The length-L spreading can be also implemented by L time's bit-level repetition with additional UE-specific interleaving/scrambling or modulation, as depicted in FIG. 5B and FIG. 5C, respectively.

According to an embodiment, the design target is to make sure $M(\vec{c})\cdot s_l = M(\vec{c}_l) = M_l(\vec{c})$, for each l=1, ..., L.

In an embodiment, symbol-level spreading with complex-valued elements picked from {1, −1, j, −j} is used. This technique represents the whole modulation constellation rotated by angles {0, pi, pi/2, -pi/2}. The equality between UE-specific modulation and symbol-level spreading can be shown as follow:

$$\begin{cases} M_l(\vec{c}) = M(\vec{c}), & \text{if } s_l = 1; \\ M_l(\vec{c}) = M(\vec{c})*e^{-\pi j}, & \text{if } s_l = -1; \\ M_l(\vec{c}) = M(\vec{c})*e^{\frac{\pi}{2}j}, & \text{if } s_l = j; \\ M_l(\vec{c}) = M(\vec{c})*e^{-\frac{\pi}{2}j}, & \text{if } s_l = -j; \end{cases}$$

According to various embodiments, equivalent bit-level processing based on different modulation orders are presented separately.

Case 1: QPSK

The QPSK constellation denotes each two consecutive coded binary bits $\vec{c}=\{b_0, b_1\}$ are mapped to one symbol as the following equation (note that the sequential order between $b_0$, $b_1$ can be interchanged. The same is true for Cases 2, 3, and 4):

$$M(\vec{c}) = \frac{1}{\sqrt{2}}[(1-2b_0) + j(1-2b_1)].$$

Figure 6:
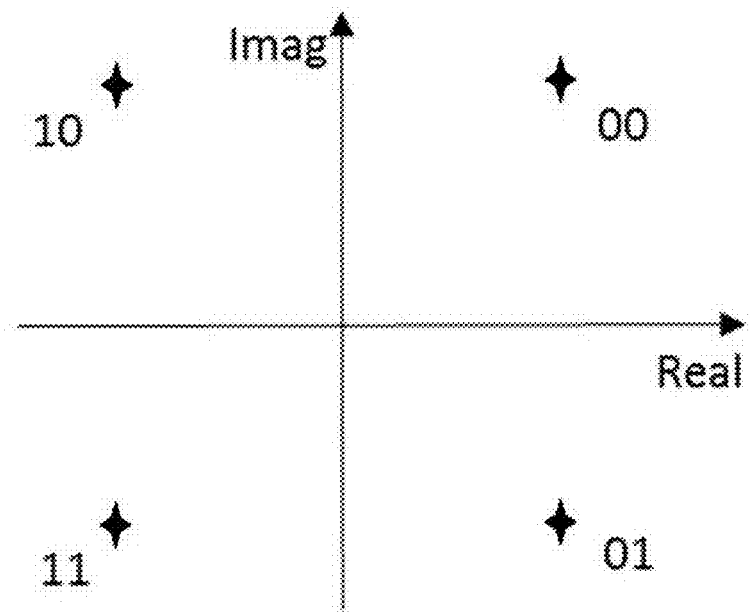
FIG. 6 depicts a bit-to-symbol mapping constellation for QPSK, according to an embodiment.
Figure 7:
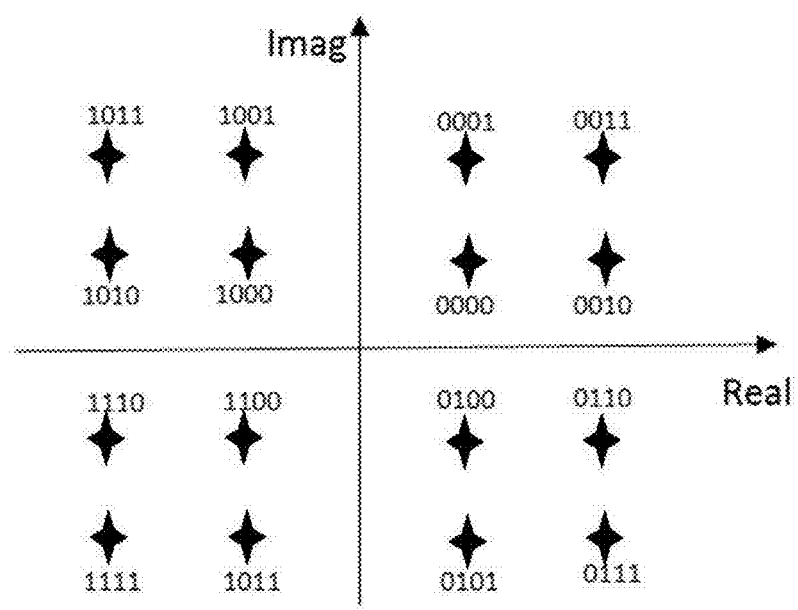
FIG. 7 depicts a bit-to-symbol mapping constellation for 16QAM, according to an embodiment.

The value $b_0$ denotes the sign of the real part of the complex-valued modulation symbol, and $b_1$ denotes the sign of the imaginary part of the complex-valued modulation symbol, as the bit-to-symbol mapping constellation shown in FIG. 6.

if $s_l=1$, then $M(\vec{c})*s_l=M(\vec{c}_l)$ and there is no need for bit-level processing, (i.e., $\vec{c}_l=\vec{c}$).

if $s_l=-1$, then $$M(\vec{c})*s_l = -\frac{1}{\sqrt{2}}[(1-2b_0) + j(1-2b_1)] =$$

$$\frac{1}{\sqrt{2}}[(1-2(1-b_0)) + j(1-2(1-b_1))] = M[1-\vec{c}],$$

which can be represented by bit-level scrambling with scrambling sequence $\vec{s}_l=\{1,1\}$, with no interleaving $I_l(\vec{c})=\vec{c}$. $\vec{c}_l=(I_l(\vec{c})+\vec{s}_l)$ mod $2=1-\vec{c}$.

if $s_l=j$, then $$M(\vec{c})*s_l = \frac{1}{\sqrt{2}}[j(1-2b_0) - (1-2b_1)] =$$

$$\frac{1}{\sqrt{2}}[(1-2(1-b_1)) + j(1-2b_0)] = M[\{1-b_1, b_0\}],$$

which can be represented by bit-level interleaving and scrambling, as the interleaving pattern $$\begin{cases} I_l(b_0) = b_1, \\ I_l(b_1) = b_0 \end{cases}$$

and the scrambling sequence $\vec{s}_l=\{1,0\}$. $\vec{c}_l=(I_l(\vec{c})+\vec{s}_l)$ mod $2=\{1-b_1, b_0\}$.

if $s_l=-j$, then $$M(\vec{c})*s_l = \frac{1}{\sqrt{2}}[-j(1-2b_0) + (1-2b_1)] =$$

$$\frac{1}{\sqrt{2}}[(1-2b_1) + j(1-2(1-b_0))] = M[\{b_1, 1-b_0\}],$$

which can be represented by bit-level interleaving and scrambling, as the interleaving pattern $$\begin{cases} I_l(b_0) = b_1, \\ I_l(b_1) = b_0 \end{cases}$$

and the scrambling sequence $\vec{s}_l=\{0,1\}$. $\vec{c}_l=(I_l(\vec{c})+\vec{s}_l)$ mod $2=\{b_1, 1-b_0\}$.

Case 2:16 QAM

The 16QAM constellation denotes each four consecutive coded binary bits $\vec{c}=\{b_0, b_1, b_2, b_3\}$ are mapped to one symbol as the following equation:

$$M(\vec{c}) = \frac{1}{\sqrt{10}}\{(1-2b_0)[2-(1-2b_2)] + j(1-2b_1)[2-(1-2b_3)]\}.$$

if $s_l=1$, then $M(\vec{c})*s_l=M(\vec{c}_l)$ and there is no need for bit-level processing, (i.e., $\vec{c}_l=\vec{c}$).

if $s_l=-1$, then $$M(\vec{c})*s_l = -\frac{1}{\sqrt{10}}\{(1-2b_0)[2-(1-2b_2)] - j(1-2b_1)[2-(1-2b_3)]\} =$$

$$\frac{1}{\sqrt{10}}\{(1-2(1-b_0))[2-(1-2b_2)] + j(1-2(1-b_1))[2-(1-2b_3)]\} =$$

$$M(\{1-b_0, 1-b_1, b_2, b_3\})$$

which can be represented by bit-level scrambling with scrambling sequence $\vec{s}_l=\{1,1,0,0\}$, with no interleaving $I_l(\vec{c})=\vec{c}_l$. $\vec{c}_l(I_l(\vec{c})+\vec{s}_l)$ mod $2=\{1-b_0, 1-b_1, b_2, b_3\}$.

if $s_l=j$, then $$M(\vec{c})*s_l = \frac{1}{\sqrt{10}}\{j(1-2b_0)[2-(1-2b_2)] - (1-2b_1)[2-(1-2b_3)]\} =$$

$$\frac{1}{\sqrt{10}}\{(1-2(1-b_1))[2-(1-2b_3)] + j(1-2b_0)[2-(1-2b_2)]\} =$$

$$M(\{1-b_1, b_0, b_3, b_2\})$$

which can be represented by bit-level interleaving and scrambling, as the interleaving pattern $$\begin{cases} I_l(b_0) = b_1 \\ I_l(b_1) = b_0 \\ I_l(b_2) = b_3 \\ I_l(b_3) = b_2 \end{cases}$$

and the scrambling sequence $\vec{s}_l = \{1,0,0,0\}$ $\vec{c}_l = (I_l(\vec{c}) + \vec{s}_l)$ mod 2 = mod 2 = $\{1-b_1, b_0, b_3, b_2\}$ if $s_l = -j$, then $$M(\vec{c}) * s_l = \frac{1}{\sqrt{10}} \{-j(1-2b_0)[2-(1-2b_2)] + (1-2b_1)[2-(1-2b_3)]\} =$$

$$\frac{1}{\sqrt{10}} \{(1-2b_1)[2-(1-2b_3)] + j(1-2(1-b_0))[2-(1-2b_2)]\} =$$

$$M(\{b_1, 1-b_0, b_3, b_2\})$$

which can be represented by bit-level interleaving and scrambling, as the interleaving $$\begin{cases} I_l(b_0) = b_1 \\ I_l(b_1) = b_0 \\ I_l(b_2) = b_3 \\ I_l(b_3) = b_2 \end{cases}$$

and the scrambling sequence $\vec{s}_l = \{0,1,0,0\}$.

$\vec{c}_l = (I_l + \vec{s}_l)$ mod 2 = $\{b_1, 1-b_0, b_3, b_2\}$

Case 3: 64QAM

The 64QAM constellation denotes each six consecutive coded binary bits $\vec{c} = \{b_0, b_1, b_2, b_3, b_4, b_5\}$ are mapped to one symbol as the following equation:

$$M(\vec{c}) = \frac{1}{\sqrt{42}} \{(1-2b_0)[4-(1-2b_2)[2-(1-2b_4)]] +$$

$$j(1-2b_1)[4-(1-2b_3)[2-(1-2b_5)]]\}.$$

Figure 8:
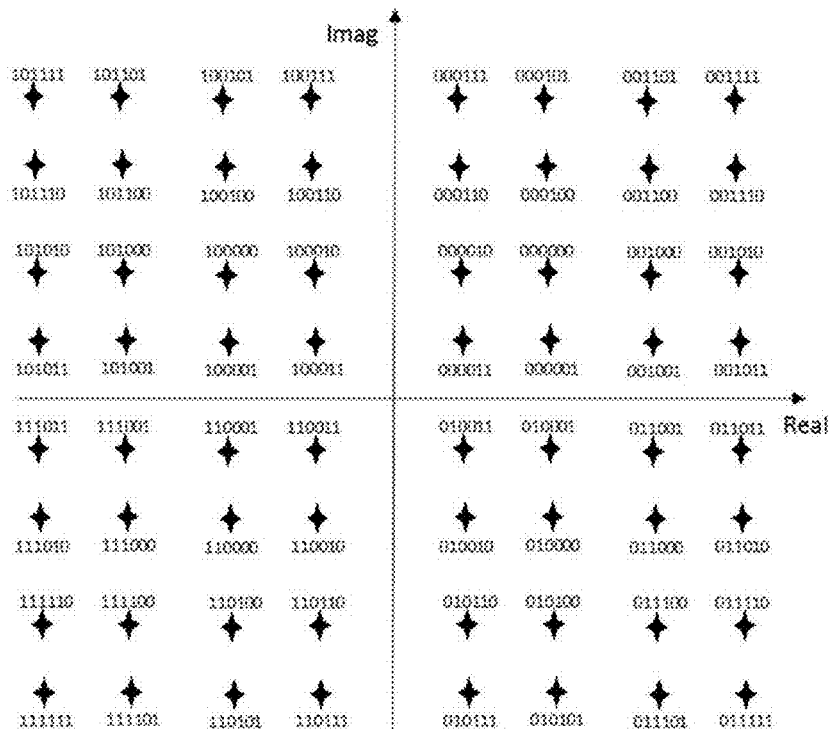
FIG. 8 depicts a bit-to-symbol mapping constellation for 64QAM, according to an embodiment.

The bit-to-symbol mapping constellation for 64QAM is shown in FIG. 8. Basically, $b_0$ denotes the sign of the real part of the complex-valued modulation symbol, $b_1$ denotes the sign of the imaginary part, $b_2$ and $b_4$ are used to distinguish different coefficients of the real part (columns on the constellation), $b_3$ and $b_5$ are used to distinguish different coefficients of the imaginary part (rows on the constellation) of the complex-valued modulation symbol.

if $s_l = 1$, $M(\vec{c}) * s_l = M(\vec{c}_l)$ and there is no need for bit-level processing.

if $s_l = -1$, then $$M(\vec{c}) * s_l = -\frac{1}{\sqrt{42}} \{(1-2b_0)[4-(1-2b_2)[2-(1-2b_4)]] -$$

$$j(1-2b_1)[4-(1-2b_3)[2-(1-2b_5)]]\} =$$

-continued $$\frac{1}{\sqrt{42}} \{(1-2(1-b_0))[4-(1-2b_2)[2-(1-2b_4)]] +$$

$$j(1-2(1-b_1))[4-(1-2b_3)[2-(1-2b_5)]]\} =$$

$$M(\{1-b_0, 1-b_1, b_2, b_3, b_4, b_5\})$$

which can be represented by bit-level scrambling with scrambling sequence $\vec{s}_l = \{1,1,0,0,0,0\}$, with no interleaving $I_l(\vec{c}_l) = \vec{c}$ and $\vec{c}_l = (I_l(\vec{c}) + \vec{s}_l)$ mod 2 = $\{1-b_0, 1-b_1, b_2, b_3, b_4, b_5\}$.

if $s_l = j$, then $$M(\vec{c}) * s_l = j\frac{1}{\sqrt{42}} \{(1-2b_0)[4-(1-2b_2)[2-(1-2b_4)]] -$$

$$(1-2b_1)[4-(1-2b_3)[2-(1-2b_5)]]\} =$$

$$\frac{1}{\sqrt{42}} \{(1-2(1-b_1))[4-(1-2b_3)[2-(1-2b_5)]] +$$

$$j(1-2b_0)[4-(1-2b_2)[2-(1-2b_4)]]\} =$$

$$M(\{1-b_1, b_0, b_3, b_2, b_5, b_4\})$$

which can be represented by bit-level interleaving and scrambling, as the interleaving pattern $$\begin{cases} I_l(b_0) = b_1 \\ I_l(b_1) = b_0 \\ I_l(b_2) = b_3 \\ I_l(b_3) = b_2 \\ I_l(b_4) = b_5 \\ I_l(b_5) = b_4 \end{cases}$$

and the scrambling sequence $\vec{s}_l = \{1,0,0,0,0,0\}$
$\vec{c}_l = (I_l(\vec{c}) + \vec{s}_l)$ mod 2 = $\{1-b_1, b_0, b_3, b_2, b_5, b_4\}$ if $s_l = -j$, then $$M(\vec{c}) * s_l = -j\frac{1}{\sqrt{42}} \{(1-2b_0)[4-(1-2b_2)[2-(1-2b_4)]] +$$

$$(1-2b_1)[4-(1-2b_3)[2-(1-2b_5)]]\} =$$

$$\frac{1}{\sqrt{42}} \{(1-2b_1)[4-(1-2b_3)[2-(1-2b_5)]] +$$

$$j(1-2(1-b_0))[4-(1-2b_2)[2-(1-2b_4)]]\} =$$

$$M(\{b_1, 1-b_0, b_3, b_2, b_5, b_4\})$$

which can be represented by bit-level interleaving and scrambling, as the interleaving pattern $$\begin{cases} I_l(b_0) = b_1 \\ I_l(b_1) = b_0 \\ I_l(b_2) = b_3 \\ I_l(b_3) = b_2 \\ I_l(b_4) = b_5 \\ I_l(b_5) = b_4 \end{cases}$$

and the scrambling sequence $\vec{s}_i=\{0,1,0,0,0,0\}$ $\vec{c}_i=(I_l(\vec{c})+\vec{s}_i)$ mod $2=\{b_1, 1-b_0, b_3, b_2, b_5, b_4\}$ Case 4: 256QAM The 256QAM constellation denotes each six consecutive coded binary bits $\vec{c}=\{b_0, b_1, b_2, b_3, b_4, b_5, b_6, b_7\}$ are mapped to one symbol as the following equation:

$$M(\vec{c}) = \frac{1}{\sqrt{170}}\{(1-2b_0)[8-(1-2b_2)[4-(1-2b_4)[2-(1-2b_6)]]] + j(1-2b_1)[8-(1-2b_3)[4-(1-2b_5)[2-(1-2b_7)]]]\}$$

Figure 9:
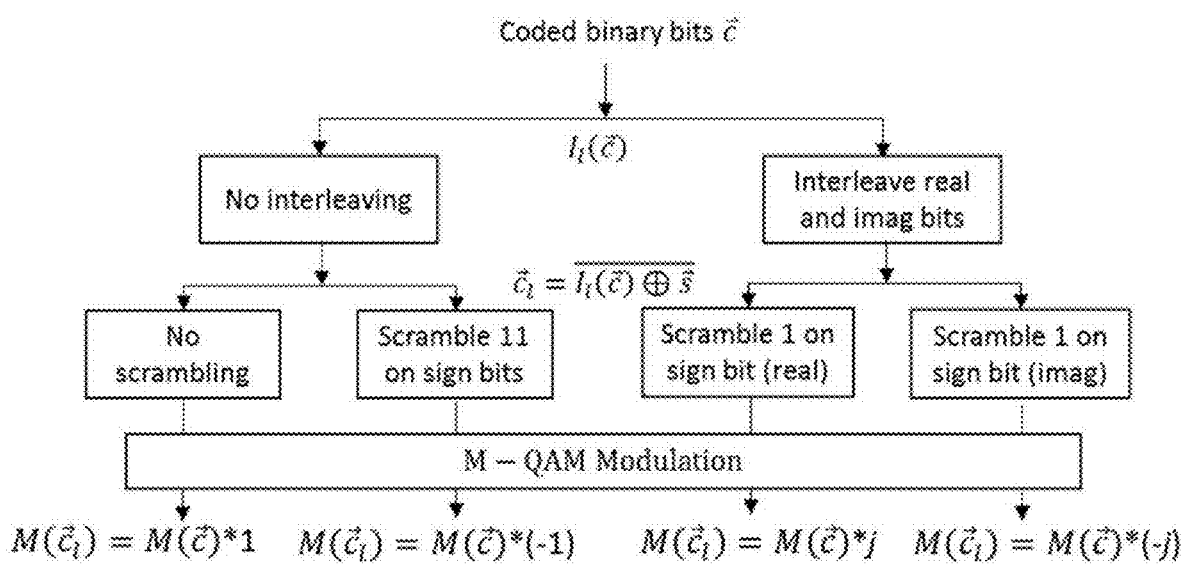
FIG. 9 depicts a bit-level processing procedure, according to an embodiment.

For simplicity, the bit-to-symbol mapping constellation for 256QAM has not been plotted. The value $b_0$ denotes the sign of the real part of the complex-valued modulation symbol, $b_1$ denotes the sign of the imaginary part, $b_2$, $b_4$, and $b_6$ are used to distinguish different coefficients of the real part (columns on the constellation), $b_3$, $b_5$ and $b_7$ are used to distinguish different coefficients of the imaginary part (rows on the constellation) of the complex-valued modulation symbol.

if $s_i=1$, then $M(\vec{c})*s_i=M(\vec{c}_i)$ and there is no need for bit-level processing.

if $s_i=-1$, then $$M(\vec{c})*s_i = -\frac{1}{\sqrt{170}}\{(1-2b_0)[8-(1-2b_2)[4-(1-2b_4)[2-(1-2b_6)]]] - j(1-2b_1)[8-(1-2b_3)[4-(1-2b_5)[2-(1-2b_7)]]]\} = M(\{1-b_0, 1-b_1, b_2, b_3, b_4, b_5, b_6, b_7\})$$

which can be represented by bit-level scrambling with scrambling sequence $\vec{s}_i=\{1,1,0,0,0,0,0,0\}$, with no interleaving $I_l(\vec{c})=\vec{c}_l$, and $\vec{c}_i=(I_l(\vec{c})+\vec{s}_i)$ mod $2=\{1-b_0, 1-b_1, b_2, b_3, b_4, b_5, b_6, b_7\}$.

if $s_i=j$, then $$M(\vec{c})*s_i = j\frac{1}{\sqrt{170}}\{(1-2b_0)[8-(1-2b_2)[4-(1-2b_4)[2-(1-2b_6)]]] - (1-2b_1)[8-(1-2b_3)[4-(1-2b_5)[2-(1-2b_7)]]]\} = M(\{1-b_1, b_0, b_3, b_2, b_5, b_4, b_7, b_6\})$$

which can be represented by bit-level interleaving and scrambling, as the interleaving pattern $$\begin{cases} I_l(b_0) = b_1 \\ I_l(b_1) = b_0 \\ I_l(b_2) = b_3 \\ I_l(b_3) = b_2 \\ I_l(b_4) = b_5 \\ I_l(b_6) = b_7 \\ I_l(b_7) = b_6 \end{cases}$$

and the scrambling sequence $\vec{s}_i=\{1,0,0,0,0,0,0,0\}$ $\vec{c}_i=(I_l(\vec{c}+\vec{s}_i))$ mod $2=\{1-b_1, b_0, b_3, b_2, b_5, b_4, b_7, b_6\}$ if $s_i=-j$, then $$M(\vec{c})*s_i = -j\frac{1}{\sqrt{170}}\{(1-2b_0)[8-(1-2b_2)[4-(1-2b_4)[2-(1-2b_6)]]] + (1-2b_1)[8-(1-2b_3)[4-(1-2b_5)[2-(1-2b_7)]]]\} = M(\{b_1, 1-b_0, b_3, b_2, b_5, b_4, b_7, b_6\})$$

which can be represented by bit-level interleaving and scrambling, as the interleaving pattern $$\begin{cases} I_l(b_0) = b_1 \\ I_l(b_1) = b_0 \\ I_l(b_2) = b_3 \\ I_l(b_3) = b_2 \\ I_l(b_4) = b_5 \\ I_l(b_6) = b_7 \\ I_l(b_7) = b_6 \end{cases}$$

and the scrambling sequence $\vec{s}_i=\{0,1,0,0,0,0,0,0\}$ $\vec{c}_i=(I_l(\vec{c})+\vec{s}_i$ mod $2=\{b_1, 1-b_0, b_3, b_2, b_5, b_4, b_7, b_6\}$ The processing procedure can be concluded as depicted in FIG. 9. Note that for any M-QAM (with order Q) complex-valued modulation constellation, which is symmetrical about the both axes, assuming there are two sign bits indicating the real part and imaginary part of the modulated symbol respectively, half of the remaining (Q-2) bits denote the coefficients of the real part and the other half of the remaining (Q-2) bits with odd denote the coefficients of imaginary part, the symbol-level spreading with the element of spreading sequence taken from $\{1, -1, j, -j\}$ can be realized by the bit-level repetition techniques discussed herein plus interleaving and/or scrambling, where the interleaver can interchange the bits denoting the real part and imaginary part, and the scrambling is used to shift the sign bits.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope of as defined by the following claims. For example, the steps of the various methods can be reordered in ways that will be apparent to those of skill in the art.

What is claimed is:

1. A method, carried out by a wireless communication device, comprising:

determining, for an element from a plurality of elements of a spreading sequence based on the element, whether to perform randomization on a coded data stream, wherein each element of the spreading sequence belongs to a set $\{1, -1, j, -j\}$;

applying to each element of the spreading sequence based on the value of the element, for which randomization is determined to be applied, one or more randomization techniques to the coded data stream;
modulating the coded data stream; and
transmitting the modulated data stream.

2. The method of claim 1, further comprising:
performing bit-level repetition on the coded data stream for each element of the spreading sequence for which randomization is determined to be applied.

3. The method of claim 1, wherein the applying one or more randomization techniques to the coded data stream comprises applying a scrambling technique to the coded data stream.

4. The method of claim 1, wherein the applying one or more randomization techniques to the coded data stream comprises applying an interleaving technique and applying a scrambling technique to the coded data stream.

5. The method of claim 4, wherein the applying an interleaving technique comprises interleaving real and imaginary bits of the code data stream.

6. The method of claim 4, wherein the applying a scrambling technique comprises scrambling a 1 on a sign bit of a real bit of the code data stream.

7. The method of claim 4, wherein the applying a scrambling technique comprises scrambling a 1 on a sign bit of an imaginary bit of the code data stream.

8. The method of claim 4, wherein the applying a scrambling technique comprises scrambling a 0 on a sign bit of a real bit of the code data stream.

9. The method of claim 4, wherein the applying a scrambling technique comprises scrambling a 0 on a sign bit of an imaginary bit of the code data stream.

10. The method of claim 1, further comprising:
applying a spreading sequence to the modulated data stream.

11. The method of claim 1, wherein the modulating the coded data stream comprises applying a device-specific modulation to the coded data stream.

12. The method of claim 1, further comprising:
carrying out a bit-to-symbol mapping on the coded data stream.

13. An apparatus comprising:
logic circuitry configured to perform operations comprising:
determining, for an element from a plurality of elements of a spreading sequence based on the element, whether to perform randomization on a coded data stream, wherein each element of the spreading sequence belongs to a set $\{1, -1, j, -j\}$;
applying to each element of the spreading sequence, based on the value of the element, for which randomization is determined to be applied, one or more randomization techniques to the coded data stream;
modulating the coded data stream; and
transmitting the modulated data stream.

14. The apparatus of claim 13, wherein the operations further comprise:
performing bit-level repetition on the coded data stream for each element of the spreading sequence for which randomization is determined to be applied.

15. The apparatus of claim 13, wherein the operations further comprise:
applying a spreading sequence to the modulated data stream.

16. A non-transitory computer readable medium including executable code that when executed by a logic circuitry performs operations comprising:
determining, for an element from a plurality of elements of a spreading sequence based on the element, whether to perform randomization on a coded data stream, wherein each element of the spreading sequence belongs to a set $\{1, -1, j, -j\}$;
applying to each element of the spreading sequence, based on the value of the element, for which randomization is determined to be applied, one or more randomization techniques to the coded data stream;
modulating the coded data stream; and
transmitting the modulated data stream.

17. The non-transitory computer readable medium of claim 16, wherein the operations further comprise:
performing bit-level repetition on the coded data stream for each element of the spreading sequence for which randomization is determined to be applied.

18. The non-transitory computer readable medium of claim 16, wherein the operations further comprise:
applying a spreading sequence to the modulated data stream.

* * * * *